US006208384B1

(12) United States Patent
Schultheiss

(10) Patent No.: US 6,208,384 B1
(45) Date of Patent: Mar. 27, 2001

(54) METHODS AND SYSTEMS FOR PROVIDING INFORMATION TO A TELEVISION USING A PERSONAL COMPUTER

(75) Inventor: Christopher J. Schultheiss, New Smyrna Beach, FL (US)

(73) Assignee: Douglas G. Brown, Cherryville, NC (US)

( * ) Notice: Subject to any disclaimer, the term of this patent is extended or adjusted under 35 U.S.C. 154(b) by 0 days.

(21) Appl. No.: 08/678,772

(22) Filed: Jul. 11, 1996

(51) Int. Cl.[7] .................................................. H04N 7/00

(52) U.S. Cl. .................... 348/552; 348/734; 348/906; 345/327

(58) Field of Search .................................. 348/552, 554, 348/734, 6, 7, 10, 12, 13, 723, 906; 359/142–146, 148; 340/825.69, 825.71; 455/6.1, 6.2, 6.3, 151.2, 151.4, 557, 352, 66, 180.1, 188.1, 186.1; 386/69; 345/327; 364/146, 188, 189, 190; 395/326; H04N 7/00, 7/10

(56) References Cited

U.S. PATENT DOCUMENTS

| 4,706,121 | 11/1987 | Young ................................ 358/142 |
| 4,751,578 | 6/1988 | Reiter et al. ...................... 358/183 |
| 4,907,079 | 3/1990 | Turner et al. ..................... 358/84 |
| 5,014,128 | 5/1991 | Chen et al. ....................... 358/160 |
| 5,065,425 | 11/1991 | Lecomte et al. .................. 379/93 |
| 5,101,499 | 3/1992 | Streck et al. ..................... 455/4 |
| 5,138,649 | 8/1992 | Krisbergh et al. ............... 379/56 |
| 5,192,999 | 3/1993 | Graczyk et al. ................. 358/85 |
| 5,249,164 | 9/1993 | Koz .................................. 358/21 R |
| 5,251,301 | 10/1993 | Cook ................................. 395/200 |
| 5,283,819 | 2/1994 | Glick et al. ....................... 379/90 |
| 5,293,357 | 3/1994 | Hallebeck ........................ 348/734 |
| 5,339,095 | 8/1994 | Redford ........................... 345/158 |
| 5,359,367 | 10/1994 | Stockill ............................ 348/552 |
| 5,396,546 | 3/1995 | Remillard ........................ 379/96 |
| 5,421,030 | 5/1995 | Baran ................................ 455/5.1 |
| 5,461,667 | 10/1995 | Remillard ........................ 379/96 |
| 5,485,221 | 1/1996 | Banker et al. ................... 348/563 |
| 5,488,412 | 1/1996 | Majeti et al. .................... 348/10 |

(List continued on next page.)

FOREIGN PATENT DOCUMENTS

| WO 96/17473 | 6/1996 | (WO) . |
| WO 97/48228 | 12/1997 | (WO) . |
| WO 97/48230 | 12/1997 | (WO) . |
| WO 97/49242 | 12/1997 | (WO) . |
| WO 98/03012 | 1/1998 | (WO) . |

OTHER PUBLICATIONS

U.S. Ser. No. 08/678,772, Schultheiss, filed Jul. 11, 1996.
International Search Report, PCT/US99/00461, Apr. 28, 1999.
International Search Report, PCT/US97/12166, Nov. 11, 1997.

*Primary Examiner*—Victor R. Kostak
(74) *Attorney, Agent, or Firm*—Myers Bigel Sibley & Sajovec

(57) ABSTRACT

A personal computer is used to download and process auxiliary services which are intended for a television. Accordingly, information is provided to a television using a personal computer, so that the personal computer's processing power and memory may be used rather than stand-alone devices or a television memory. An external network interface is provided in the computer, as well as a low power television transmitter or transceiver. A unified television/personal computer remote control provides personal computer commands to the personal computer via radio frequency signals. Television commands may be provided to the television directly using infrared signals or indirectly through the personal computer using radio frequency signals. When television commands are provided using radio frequency signals, an infrared converter is provided for the television, to convert the radio frequency signals to infrared signals.

24 Claims, 3 Drawing Sheets

U.S. PATENT DOCUMENTS

| | | | |
|---|---|---|---|
| 5,570,415 | 10/1996 | Stretton et al. | 379/110 |
| 5,606,361 | 2/1997 | Davidsohn et al. | 348/14 |
| 5,619,251 * | 4/1997 | Kuroiwa et al. | 348/12 |
| 5,636,211 * | 6/1997 | Newlin et al. | 370/465 |
| 5,648,781 | 7/1997 | Choi | 341/146 |
| 5,675,390 * | 10/1997 | Schindler et al. | 348/552 |
| 5,703,636 | 12/1997 | Cifaldi | 348/14 |
| 5,706,334 | 1/1998 | Balk et al. | 379/67 |
| 5,760,824 | 6/1998 | Hicks, III | 348/14 |

\* cited by examiner

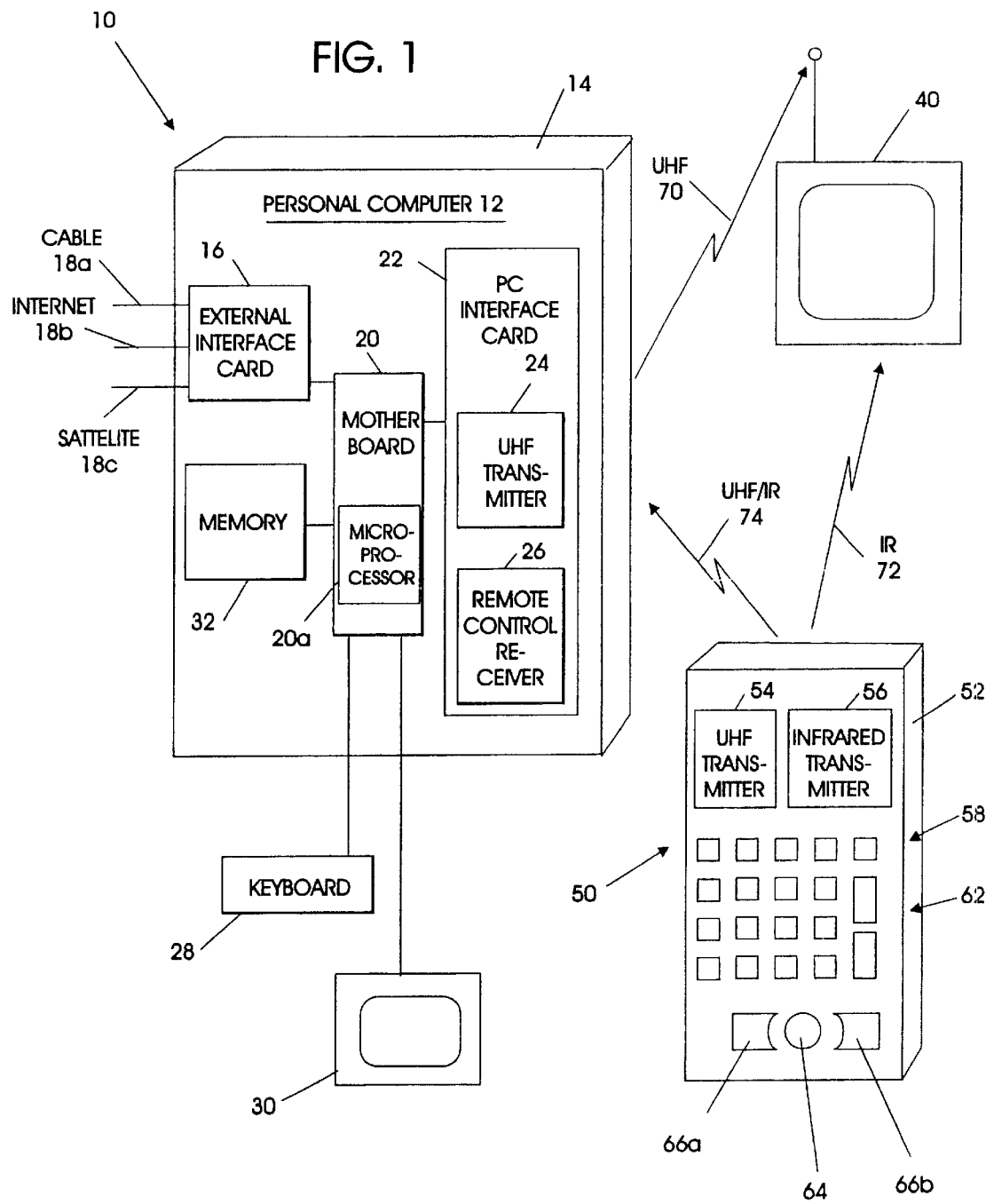

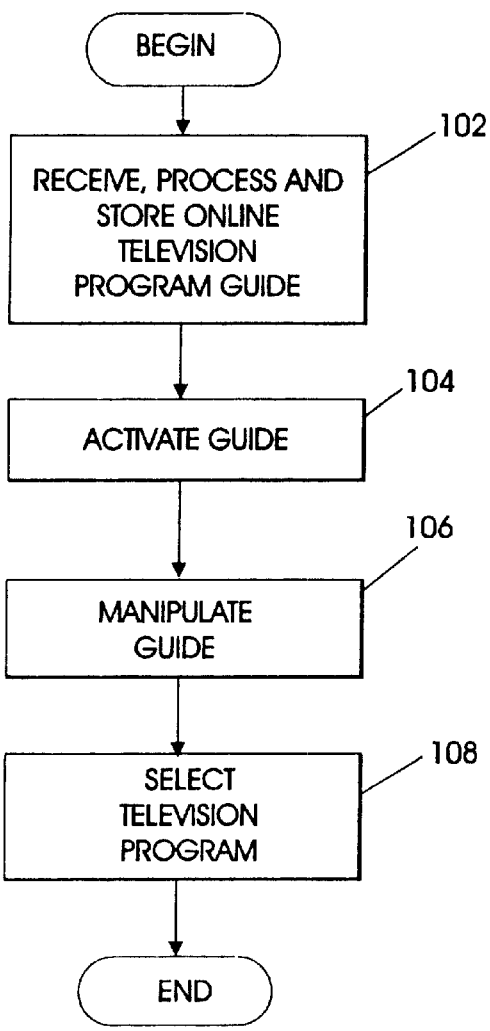

METHODS AND SYSTEMS FOR PROVIDING INFORMATION TO A TELEVISION USING A PERSONAL COMPUTER

FIELD OF THE INVENTION

This invention relates to television systems and methods, and more particularly to remote control systems and methods for television.

BACKGROUND OF THE INVENTION

The television (TV) has become ubiquitous in modern society. As a result, many additional services are being provided via television. One example of an additional service which is being provided via television is an online television program guide, wherein television program schedule information is displayed on a television for searching and selection by a television viewer. Online television program guides are described in U.S. Pat. No. 4,751,578 to Reiter et al. entitled "System for Electronically Controllably Viewing on a Television Updateable Television Programming Information" and U.S. Pat. No. 5,293,357 to Hallenbeck entitled "Method and Apparatus for Controlling a Television Program Recording Device" both of which are assigned to the assigned to the assignee of the present invention, the disclosures of both of which are hereby incorporated herein by reference. Other services which are being provided or have been proposed in connection with television include interactive video, video games, online stock quotation and/or banking, and video-on-demand.

As a result of the proliferation of additional television services, a variety of accessory units, such as cable television descramblers, video game players, online television program guide receivers and satellite television receivers have been marketed. Unfortunately, these accessory units may be costly and may limit consumer acceptance of the additional services. As an alternative to accessory units, additional computing power and memory have been included in the television itself, for use with online television program guides and the like. Unfortunately, the added computing power and memory may increase the cost of the television itself.

SUMMARY OF THE INVENTION

It is therefore an object of the invention to provide improved methods and systems for providing additional television services.

It is another object of the present invention to provide methods and systems for providing additional television services, without requiring costly add-on accessory units.

It is yet another object of the present invention to provide methods and systems for providing additional television services, without requiring computing power and memory to be added within a television.

These and other objects are provided, according to the present invention, by methods and systems which provide information to a television using a personal computer. The invention stems from the realization that a large amount of computer power and memory is typically already present in the home, in the form of a personal computer. Accordingly, a personal computer is used to download and process auxiliary services which are intended for a television. The auxiliary services need not be downloaded and processed by an auxiliary unit or by the television itself.

In particular, according to the present invention, a personal computer includes a housing containing therein a processor and memory. A computer display is responsive to the processor. An external network interface is also contained in the housing, which obtains external information from an external network, such as cable television, satellite television, or the internet, and stores the external information in the memory. A low power television transmitter is also contained in the housing, which is responsive to the processor, to transmit information which is stored in the memory. A television remote control sensor is also contained in the housing. The remote control sensor is responsive to television remote control signals to control the processor and to manipulate data in the memory. Accordingly, information which is intended for a television may be downloaded into the personal computer via the external network interface and then transmitted to the television using the low power television transmitter. The television remote control sensor may be used to control the television and also to provide commands to the personal computer to process the information in the personal computer.

In a first embodiment of the present invention, the personal computer is used in combination with a unified television/personal computer remote control which transmits remote control commands to a television in response to user inputs and which also transmits personal computer commands to the television remote sensor in the housing in response to user inputs. The remote control commands which are transmitted to the television are preferably transmitted using infrared frequencies while the remote control commands which are transmitted to the personal computer may use infrared frequencies but are preferably radio frequencies (such as UHF) so that they may be transmitted from room to room without requiring direct line of sight.

In another embodiment according to the invention, the remote control may be a radio frequency (UHF) remote control, which transmits personal computer commands and television remote control signals to the personal computer in response to user inputs. In this embodiment, a television interface unit may also be provided. The television interface unit includes a radio frequency receiver which receives television video signals from the personal computer and which also receives television remote control commands from the personal computer. The television interface unit also includes a converter which is responsive to the radio frequency receiver and which converts the received television remote control commands into infrared television remote control commands. Accordingly, the remote control need not communicate directly with the TV, but may communicate with the TV via the personal computer. An all-UHF remote control may thereby be provided which does not require line of sight operation to the television or to the personal computer.

The second embodiment of the present invention preferably includes a personal computer interface, a television interface and a wireless remote control. The personal computer interface is adapted for use with a personal computer and includes a radio frequency transceiver which transmits and receives television remote control signals and which also transmits television video signals which are generated in a personal computer. The television interface is adapted for use with a television. It includes a radio frequency receiver which receives television remote control signals and television video signals from the personal computer interface. The television interface applies the received television video signals to a television for display and also converts the received television remote control signals into infrared television remote control signals.

The wireless remote control includes a user interface which accepts user input commands to remotely control a television. The wireless remote control also includes a radio frequency transmitter which transmits radio frequency remote control signals to a personal computer to remotely control a television in response to user input commands at the user interface. The personal computer interface may also relay received television remote control signals to the personal computer for processing in the personal computer, and may receive television remote control signals from the personal computer. The personal computer interface also receives personal computer commands from the radio frequency transceiver and relays the personal computer commands to a personal computer.

In a preferred embodiment, the personal computer interface is contained on a card which connects to a personal computer motherboard in a personal computer housing. Also in a preferred embodiment, the television interface also includes a radio frequency switch which switches the video input to a television between the received television video signals and an external video source. Also preferably, the wireless remote control user interface also accepts user input commands to remotely control the personal computer. The UHF transmitter also transmits UHF personal computer control signals to a personal computer, to remotely control a personal computer in response to user input commands at the user interface. An online television program guide or other television accessory service may be implemented by software which executes on the personal computer.

Two embodiments of wireless remote controls may be provided according to the present invention. In a first embodiment, a remote control housing includes a user interface, a radio frequency transmitter and an infrared transmitter. The user interface accepts user input commands. The radio frequency transmitter transmits radio frequency remote control signals in response to user input commands at the user interface. The infrared transmitter transmits infrared remote control signals in response to user input commands at the user interface. The user interface preferably includes a plurality of keys, with the radio frequency transmitter being responsive to activation of at least one of the keys and the infrared transmitter being responsive to activation of at least one of the keys. The radio frequency transmitter and the infrared transmitter may both be responsive to activation of at least one of the keys.

The user interface may also include a trackball, and the radio frequency transmitter may be responsive to activation and movement of the trackball. The user interface may also include a television program guide activation key, so that the radio frequency transmitter is responsive to activation of the television program guide activation key to transmit a command to a personal computer to activate a television program guide in the personal computer, and the infrared transmitter is responsive to activation of the television program guide activation key to transmit a command to a television to tune into a television channel which will receive the television program guide from the personal computer.

A second embodiment of a wireless remote control includes a remote control housing, a user interface in the housing and a radio frequency transmitter in the housing. The user interface accepts user input commands to remotely control a personal computer and to remotely control a television. The radio frequency transmitter transmits radio frequency remote control signals to remotely control a personal computer and to remotely control a television in response to user input commands at the user interface. Preferably, the user interface includes a plurality of keys, including personal computer remote control keys and television remote control keys. The radio frequency transmitter is responsive to activation of the personal computer keys to transmit personal computer remote control commands and is responsive to activation of the television remote control keys to transmit television remote control commands.

A first method of interfacing a personal computer with a television includes the steps of obtaining at the personal computer, external information from an external network and storing the external information in personal computer memory. Remote control signals are wirelessly received at the personal computer in response to user inputs at a wireless remote control. Information is wirelessly transmitted from the personal computer memory to a television in response to the user inputs which are wirelessly received at the personal computer. The information from the personal computer may also include television program video signals for the television. The remote control signals which are received at the personal computer may be infrared television remote control signals or radio frequency signals.

In a second method according to the present invention, a television is remotely controlled by accepting user input commands to remotely control a television, from a wireless remote control. Radio frequency remote control signals are transmitted from the wireless remote control to a personal computer. The radio frequency remote control signals are received at the personal computer. Television remote control signals and television video signals are transmitted from the personal computer to a television. The received television video signals are applied to the television for display. The received television remote control signals are converted into infrared television remote control signals to control the television.

Accordingly, the computer power and memory of the personal computer are used to provide additional services and remote control for a television. Expensive add-on units and/or expensive televisions, which contain high powered computer processing and memory, are thereby rendered unnecessary.

BRIEF DESCRIPTION OF THE DRAWINGS

FIG. 1 illustrates a first embodiment of a system for providing information to a television using a personal computer according to the present invention.

FIG. 2 is a flowchart illustrating operations of the system of FIG. 1.

FIG. 3 illustrates an example of a television screen which may be used during the operations of FIG. 2.

DETAILED DESCRIPTION OF PREFERRED EMBODIMENTS

Figure 4:
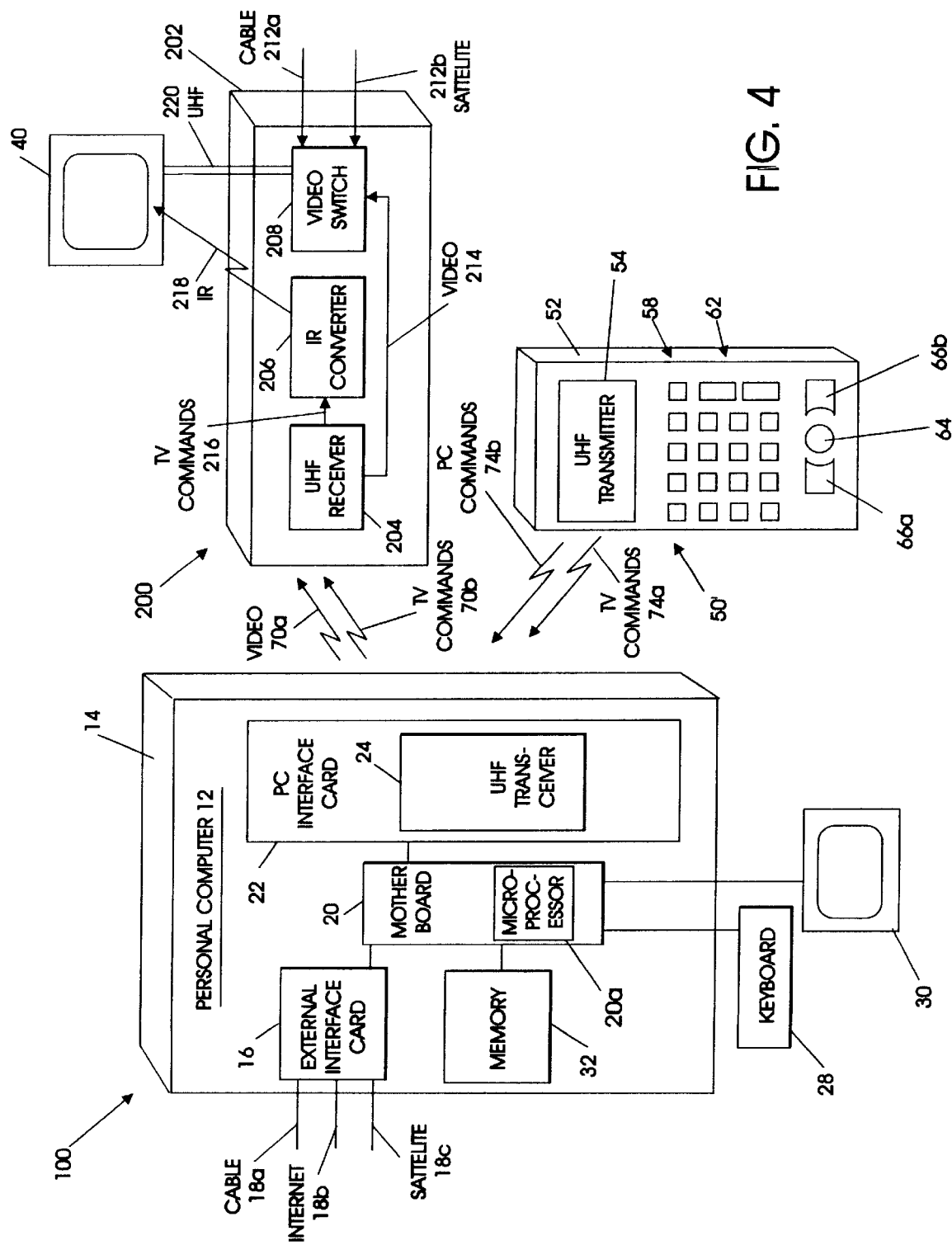
FIG. 4 illustrates a second embodiment of a system for providing information to a television using a personal computer according to the present invention.

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Referring now to FIG. 1, a first embodiment of a system for providing information to a television using a personal computer is illustrated. As shown in FIG. 1, system 10 includes a personal computer 12, a television 40 and a wireless remote control 50. Personal computer 12 includes a personal computer housing 14 and a motherboard 20. The motherboard may include a processor 20a thereon. A keyboard 28, display 30 and other conventional personal computer hardware and software may be included. Memory 32, in the form of semiconductor memory (DRAM, SRAM, EEPROM, etc.), magnetic memory (floppy and hard disk drives), optical memory (CDROM) and other conventional memory may be provided.

Personal computer 12 also includes an external interface card 16 which may plug into motherboard 20 and which obtains external information from external networks such as cable TV network 18a, internet 18b and satellite TV network 18c. Personal computer 12 also includes a PC interface card 22 which may also plug into motherboard 20. PC interface card 22 includes a radio frequency (preferably UHF) transmitter 24 and a remote control receiver 26. External interface card 16 and PC interface card 22 may be combined into a single card.

UHF transmitter 24 transmits information as UHF signals 70 to TV 40. The UHF signals may be a conventional television program which is obtained from cable interface 18a or satellite interface 18c, or may be internet data from internet interface 18b. This information may be passed directly to UHF transmitter 24 from external interface card 16. Alternatively, some or all of this information may be stored in memory 32 and then transmitted to TV 40 under remote control or under control of the personal computer as will be described below. The design of the individual component parts of personal computer 12 are well known to those having skill in the art and need not be described in greater detail herein.

Still referring to FIG. 1, wireless remote control 50 includes a remote control housing 52 and a user interface in the housing which accepts user input commands. As shown in FIG. 1, the user interface includes a plurality of keys 58 and 62, a trackball 64 and trackball keys 66a and 66b, as will be described in detail below. However, it will be understood by those having skill in the art that other user inputs may be provided via touch screen, voice activation and the like.

Wireless remote control 50 also includes a radio frequency (preferably UHF) transmitter 54 which transmits UHF remote control signals 74 to personal computer 12 in response to user input commands at the user interface. Accordingly, UHF transmitter 24 and remote control receiver 26 may be combined into a single radio frequency (UHF) transceiver. An infrared transmitter 56 in the housing 52, transmits infrared remote control signals 72 to the television in response to user input commands at the user interface. In another embodiment, a UHF transmitter 54 is not included, and infrared commands 74 are transmitted to the personal computer. In this embodiment, the remote control receiver 26 in the personal computer is an infrared receiver.

In the embodiment of FIG. 1, remote control 50 is capable of operating certain keys in the infrared mode and other keys in the UHF mode. Some keys may operate in both modes. In the embodiment shown in FIG. 1, top keys 58 operate both the UHF transmitter 54 and the infrared transmitter 56. Middle keys 62 operate the infrared transmitter only, and the trackball 64 and trackball keys 66a, 66b operate the UHF transmitter 54 only. It will be understood that the positioning of the keys can vary, so that top keys 58 will also be referred to as "combined keys" and middle keys 62 will be referred to as "infrared keys".

The infrared keys 62 are capable of emulating a broad range of conventional television remote control commands. In effect, these keys function as a "smart remote" that is capable of either learning the television's remote control commands or being designed to be compatible with a particular television 40. The trackball and trackball keys 64, 66a and 66b are used to communicate directly with the personal computer, for example to call up online television programming guide software and manipulate the online television program guide by cursor movement on screen. The combined keys 58 send both an infrared signal to the TV and a UHF signal to the personal computer.

Operation of the system 10 of FIG. 1 in connection with an online television program guide will now be described.

The general concept of an online television program guide is described in the aforesaid U.S. Pat. Nos. 4,751,578 and 5,293,357 and will not be described in detail herein.

Referring to FIG. 2, operations begin at Block 102 by receiving, processing and storing online television program guide information. The information may be received from cable 18a, internet 18b, satellite 18c or other external systems via external interface card, and may be processed by the processor 20a on motherboard 20 and stored in memory 32.

At Block 104, the online television guide is activated, for example by user activation of one of the combined keys 58. Activation of the combined key sends a UHF signal 74 to remote control receiver 26 to activate the guide in the personal computer 12. An infrared signal 72 is also sent to the television 40 to select the appropriate channel, such as channel 2. Depressing another key of the combined keys 58 may also turn the television back to the channel being viewed and deactivate the online television guide software in the computer.

Referring to Block 106, the online television guide is manipulated. For example, after activating the online guide, a television screen as shown in FIG. 3 may be displayed. The user may use the trackball 64 and trackball keys 66a and 66b to move a cursor on the screen to select a title to be viewed or to select other options for the online guide. The trackball 64 may be used to move the cursor on the screen to an appropriate box. The left click key 66a may be used to activate the function and may be activated a second time to return. Alternatively, if the left click key is activated on a title, the descriptions may be displayed. The click right key 66b may be used to select a channel and deactivate the guide.

Finally, at Block 108, a television program is selected. In order to select the program, the trackball 64 and left click button 66a may be used to move and activate the cursor on the screen. Upon selection of a program, the personal computer software supplies the appropriate channel to television 40 via UHF signal 70. The television may also need to be tuned to that channel by depressing the appropriate infrared key 62 for the channel, to thereby cause infrared command 72 to be transmitted to the television.

Due to the long turn-on or "boot" time, it may desirable to leave the personal computer 12 online for instantaneous use with the television. Otherwise, there may be significant delays while the software is brought up. A shut-down function may be required if the user wants to disable the software from the television room. Alternatively, the personal computer user may turn off the online guide at the personal computer if desired. The trackball operates like a mouse on a personal computer, to enable the user to move the cursor to appropriate places on the television screen and to activate the appropriate function. The trackball may reduce the number of keys on the remote control unit 50, and the user need not search for special functions on the remote control in a dimly lit room.

Accordingly, the embodiment of FIG. 1 allows an inexpensive card or cards to be added to a personal computer, to thereby allow the personal computer to control television. Expensive add-on boxes need not be provided, which would merely duplicate the computing power and memory which is already available in the personal computer.

The embodiment of FIG. 1 may require the user to separately tune the television channel using infrared signal 72, and separately control the personal computer using UHF or infrared commands 74. In a second embodiment of the invention, described in FIG. 4, the personal computer may control tuning and other television functions using UHF television commands so that the user need not provide separate commands to the television. However, the embodiment of FIG. 4 may require a separate television interface unit which converts received UHF television commands to infrared television commands.

As shown in FIG. 4, system 100 includes a personal computer 12 as already described. However, PC interface card 22 includes a radio frequency (preferably UHF) transceiver, i.e. a UHF transmitter/receiver 24' which both receives UHF signals from remote control unit 50' and transmits UHF signals to television interface unit 200. Remote control unit 50' only includes a UHF transmitter 54 but does not include an infrared transmitter. Activation of the combined keys 58, the conventional television keys 52 and the personal computer keys 64, 66a, 66b are all communicated to the personal computer 12 via UHF signals. The television commands from keys 58 and 62 are communicated as UHF television commands 74a, and the personal computer commands from keys 58 and keys 64, 66a and 66b are communicated as PC commands 74b.

Still referring to FIG. 4, television interface 200 includes a television interface housing 202. A UHF receiver 204 in the housing receives television remote control signals 70b and television video signals 70a from the personal computer interface 22. The received television video signals are supplied to television 40 for display via video line 214, video switch 208 and UHF input 220. Video switch 208 may also be used to switch between conventional cable 212a and satellite 212b. UHF receiver 204 also supplies the television commands to an infrared converter 206 via line 216. Infrared converter 206 converts the received television remote control signals into infrared television remote control signals 218 for controlling the television in a conventional manner.

Accordingly, as shown in FIG. 4, the system 100 allows the computer to do more than just provide listings of data. The computer can select a program from an online television program guide and also direct the TV set to tune to the appropriate channel.

Operations of the system 100 of FIG. 4 may proceed as already described in connection with FIG. 2. However, the remote control unit 50' has the ability to control the online guide via the personal computer and to control the television via the personal computer instead of remote controlling the television directly. Accordingly, when the guide is activated at Block 104, the UHF transmitter 54 can transmit an activate guide signal and the personal computer can generate a signal to activate the online television program guide within the personal computer and tune the television to the requisite channel. The guide may be manipulated as already described at Block 106. At Block 108, when a television program is selected by moving the cursor on the television display, the personal computer provides the appropriate video signal 70a and appropriate TV commands 70b to tune the television.

For example, a "What's on Now?" key may send a UHF signal to the personal computer interface card which communicates with the PC to activate the online television program guide and display the current time slot listings. The PC interface transmits the displayed listings to the television at low power and also instructs the television to switch to the designated channel to view the program listings. After the viewer selects a program of interest using the trackball and trackball keys, the personal computer and the UHF transceiver 24' send a signal to the PC interface card which deactivates the listing display. A UHF signal is sent to the television interface unit which translates the signal to an infrared signal which is recognized by the TV and which changes the channel to the desired program. The program may be received via the cable, internet or satellite interface 18a, 18b, 18c respectively at the personal computer external interface card 16, or via the satellite or cable interface 212a, 212b respectively of the television interface unit. For reception by the personal computer, a television tuner card may need to be installed.

Accordingly, the embodiment of FIG. 4 remotely controls the television by accepting user input commands to remotely control a television from a wireless remote control, and transmits UHF remote control signal from the wireless remote control to a personal computer. The UHF remote control signals are received at the personal computer. They may be processed by the personal computer. Television remote control signals and television video signals are then transmitted from the personal computer to a television. The received television video signals are applied to the television for display. The received television remote control signals are converted into infrared television remote control signals to control the television. Personal computer commands may be transmitted from the wireless remote control to the personal computer.

Other design considerations for the present invention will now be described. The UHF remote control 50 and 50' preferably transmits on radio frequencies in order to extend the range to other rooms in the home. Specifically, the personal computer may not be located in the same room as the TV 40. It is generally preferable for the remote control unit 50, 50' to be located within a line of sight of the TV so that the viewer may view the TV while operating a remote control. Therefore, to communicate with the personal computer 12, radio signals are preferred. UHF is preferred because UHF frequencies have been set aside by the Federal Communications Commission for remote control applications.

The PC interface card 22 also preferably includes the necessary functionality to demodulate the signals coming from the remote control, and to convert them into a format which is recognizable by a personal computer operating system. The UHF transceiver transmits the instructions from the personal computer as initiated by the viewer using the UHF remote control and transmits them to the infrared converter. The UHF transceiver 24' also takes the video display listings and modulates them onto a UHF carrier to be transmitted to the UHF television receiver for display on the TV screen.

The television interface unit includes a UHF receiver 204, an infrared converter 206 and a video switch 208. The UHF receiver detects and demodulates the control codes transmitted by the PC interface to control the TV functions and listing displays. The infrared converter decodes the control codes and retransmits them as infrared signals compatible with the TV set. The video switch 208 controls the selection of the incoming cable TV, off-air TV or satellite TV and also may control orientation of a remote antenna for reception.

A software package is preferably loaded onto the personal computer and uses the personal computer's processor and memory. The software may include TV listing and schedule downloading software and TV interface command software. The TV listing and schedule downloading software may include functionality to dial up a service provider and download the required listings and descriptions, selecting only the services the particular viewer receives or desires for the viewer's particular geographic area. The software may ask the viewer to input a zip code and designate whether cable, over-the-air and/or satellite services are desired. From that information, the software may download the appropriate listings for the viewer. The viewer is also capable of selectively deleting particular channels or subject matter in which there is no interest. Thus, the viewer can customize the listings to the viewer's particular requirements, including such options as how many days of listings to display, in what order to display the listings, the type of display (grid style or rolling log), what additional information is desired (such as movie reviews, sports scores, financial reports, stock quotes and general editorial).

The software also can download remote control codes for television, thus enabling the viewer to control the particular television with the system's UHF hand-held remote control. All known codes may be maintained in a database accessible by the viewer. These codes may enable operation of any television, satellite receivers or VCRs. The software may provide many other types of additional services such as descrambling, interactive video and the like.

Accordingly, the present invention allows the personal computer's full processing power and memory to be used to control a television, with the addition of an external interface card and PC interface card to a personal computer. A special remote control 50 or 55 may also be required and a television interface unit 200 may also be required. The external interface card 16, PC interface card 22, remote control 50, 50' and television interface unit 200 do not require much or any computer processing power or memory, and accordingly may be produced inexpensively. The power of the personal computer may thereby used to control the television, thus obviating the need to duplicate some or all of the computer processing power memory in online television program guide boxes, satellite television receiver boxes, interactive video game boxes and the like.

In the drawings and specification, there have been disclosed typical preferred embodiments of the invention and, although specific terms are employed, they are used in a generic and descriptive sense only and not for purposes of limitation, the scope of the invention being set forth in the following claims.

That which is claimed:

1. A personal computer system comprising
a personal computer comprising:
    a housing containing therein a processor and memory;
    a display responsive to the processor;
    an external network interface in the housing, which obtains external information from an external network and stores the external information in the memory;
    a low power television transmitter in the housing, which is responsive to the processor, to transmit information which is stored in the memory;
    a television remote control sensor, which is responsive to television remote control signals, to control the processor and manipulate information in the memory; and
a television interface unit, the television interface unit comprising:
    a radio frequency receiver which receives signals from the personal computer and which also receives television remote control commands from the personal computer; and
    a converter which is responsive to the radio frequency receiver, and which converts the received television remote control commands into infrared television remote control commands.

2. A personal computer according to claim 1 wherein the external network interface comprises at least one of a cable television interface, a satellite television interface and an internet interface.

3. A personal computer according to claim 1 wherein the low power television transmitter comprises a low power radio frequency television transmitter which transmits signals to the television under control of the processor.

4. A personal computer according to claim 1 wherein the television remote control sensor is an infrared television remote control sensor.

5. A personal computer system according to claim 1 in combination with a radio frequency remote control, which transmits personal computer commands and television remote control signals to the personal computer in response to user inputs.

6. A personal computer according to claim 1 wherein the television transmitter is also responsive to the processor, to transmit information directly from the external network interface.

7. A method of interfacing a personal computer with a television, comprising the steps of:
    obtaining at the personal computer, external information from an external network;
    storing the external information in personal computer memory;
    wirelessly receiving radio frequency television remote control signals at the personal computer;
    wirelessly transmitting radio frequency signals representing information from the personal computer and television remote control signals which were received at the personal computer;
    receiving at a remote unit, the transmitted radio frequency signals representing information from the personal computer and the television remote control signals which were received at the personal computer;
    applying the received information from the personal computer to the television; and
    converting the television remote control signals to infrared television remote control signals.

8. A method according to claim 7 wherein the obtaining step comprises the step of obtaining external information from at least one of a cable television network, a satellite television network and the internet.

9. A method according to claim 7 wherein the step of wirelessly transmitting comprises the step of wirelessly transmitting television video signals to the television.

10. A wireless remote control comprising:
    a housing;
    a user interface in the housing, which accepts user input commands;
    a radio frequency transmitter in the housing, which transmits radio frequency remote control signals in response to user input commands at the user interface; and
    an infrared transmitter in the housing, which transmits infrared remote control signals in response to user input commands at the user interface;
    wherein the user interface includes a plurality of keys, the radio frequency transmitter being responsive to activation of at least one of the keys, and the infrared transmitter being responsive to activation of at least one of the keys;
    wherein the radio frequency transmitter and the infrared transmitter are both responsive to activation of at least one of the keys; and
    wherein the user interface includes a trackball, and wherein the radio frequency transmitter is responsive to activation of the trackball.

11. A system for remotely controlling a television comprising:
    a personal computer interface, adapted for use with a personal computer, and including a radio frequency transceiver which receives television remote control signals and transmits television remote control signals, and which transmits signals which are generated in a personal computer;
    a television interface, adapted for use with a television, and including a radio frequency receiver which receives television remote control signals and signals from the personal computer interface, which applies the received signals to a television for display, and which converts the received television remote control signals into infrared television remote control signals; and a wireless remote control, including a user interface which accepts user input commands to remotely control a television, and a radio frequency transmitter which transmits radio frequency remote control signals to a personal computer to remotely control a television in response to user input commands at the user interface.

12. A system according to claim 11 wherein the personal computer interface also relays received television remote control signals to the personal computer, and receives television remote control signals from the personal computer.

13. A system according to claim 12 wherein the personal computer interface also receives personal computer commands from the radio frequency transceiver, and relays the personal computer commands to a personal computer.

14. A system according to claim 11 wherein the personal computer interface is contained on a card which connects to a personal computer motherboard in a personal computer housing.

15. A system according to claim 11 wherein the television interface further comprises a radio frequency switch which switches the video input to a television, between the received signals and an external video source.

16. A system according to claim 11 wherein the wireless remote control user interface also accepts user input commands to remotely control a personal computer, and wherein the radio frequency transmitter also transmits radio frequency personal computer control signals to a personal computer to remotely control a personal computer in response to user input commands at the user interface.

17. A method for remotely controlling a television comprising the steps of:

accepting user input commands to remotely control a television, from a wireless remote control;

transmitting radio frequency remote control signals from the wireless remote control to a personal computer;

receiving the radio frequency remote control signals at the personal computer;

transmitting television remote control signals and television video signals from the personal computer to a television;

applying the received television video signals to the television for display; and converting the received television remote control signals into infrared television remote control signals to control the television.

18. A method according to claim 17 further comprising the step of:

transmitting personal computer commands from the wireless remote control to the personal computer.

19. A method according to claim 18 further comprising the step of:

switching the video input to the television, between the received television video signals and an external video source.

20. A personal computer interface for remotely controlling a television comprising:

a radio frequency transceiver which receives television remote control signals and transmits television remote control signals, and which transmits signals which are generated in a personal computer; and an external network interface which obtains external information from an external network, and stores the external information in the personal computer;

wherein the radio frequency transceiver and the external network interface are contained on a card which connects to a personal computer motherboard in a personal computer housing.

21. A method for remotely controlling a television comprising the steps of:

accepting user input commands to remotely control a television, from a wireless remote control;

transmitting radio frequency remote control signals from the wireless remote control to a personal computer;

receiving the radio frequency remote control signals at the personal computer;

transmitting television remote control signals and other signals from the personal computer to a television;

applying the received other signals to the television for display; and converting the received television remote control signals into infrared television remote control signals to control the television.

22. A method according to claim 21 further comprising the step of:

transmitting personal computer commands from the wireless remote control to the personal computer.

23. A method according to claim 22 further comprising the step of:

switching the video input to the television, between the received signals and an external video source.

24. A personal computer interface for remotely controlling a television comprising:

a radio frequency transceiver which receives television remote control signals and transmits television remote control signals, and which transmits television video signals which are generated in a personal computer; and an external network interface which obtains external information from an external network, and stores the external information in the personal computer;

wherein the radio frequency transceiver and the external network interface are contained on a card which connects to a personal computer motherboard in a personal computer housing.

\* \* \* \* \*